No. 702,805. Patented June 17, 1902.
H. E. LINDAS.
DENTAL APPLIANCE.
(Application filed Oct. 21, 1901.)
(No Model.) 2 Sheets—Sheet 1.
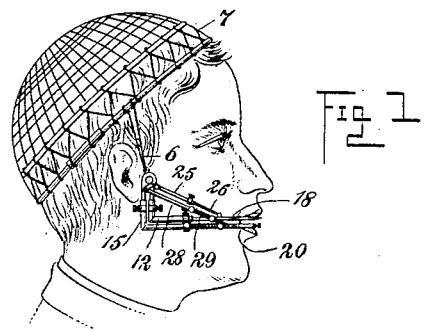
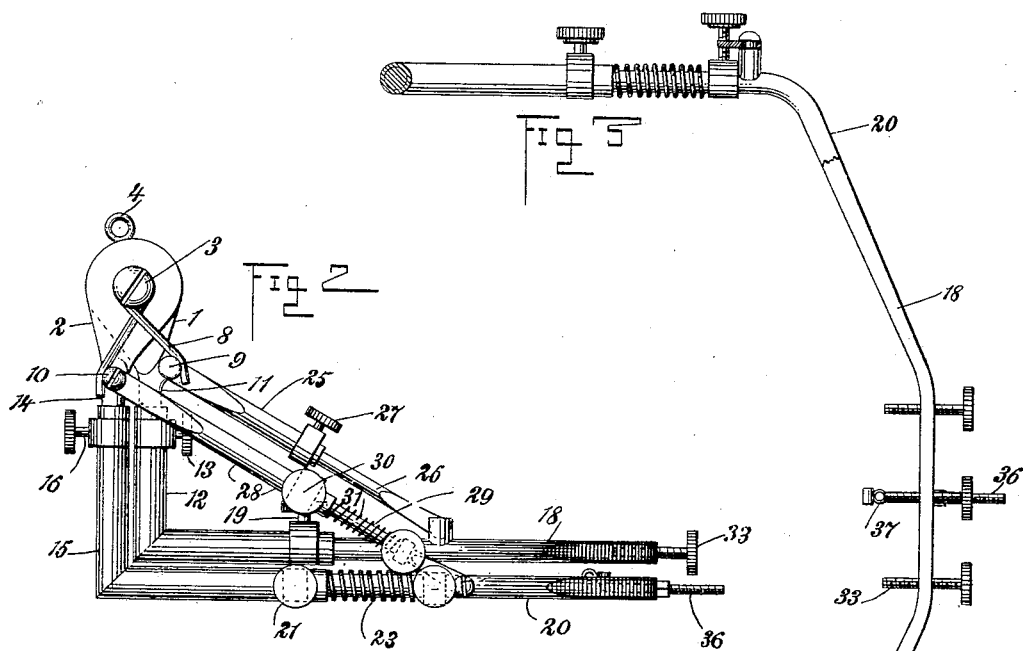
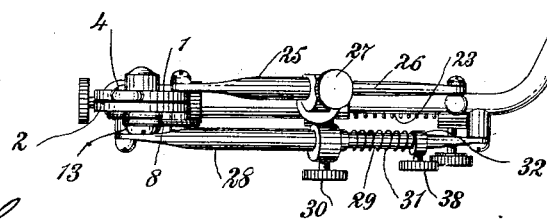
WITNESSES:
INVENTOR
Henry E. Lindas
BY
ATTORNEYS No. 702,805. Patented June 17, 1902.
H. E. LINDAS.
DENTAL APPLIANCE.
(Application filed Oct. 21, 1901.)
(No Model.) 2 Sheets—Sheet 2.
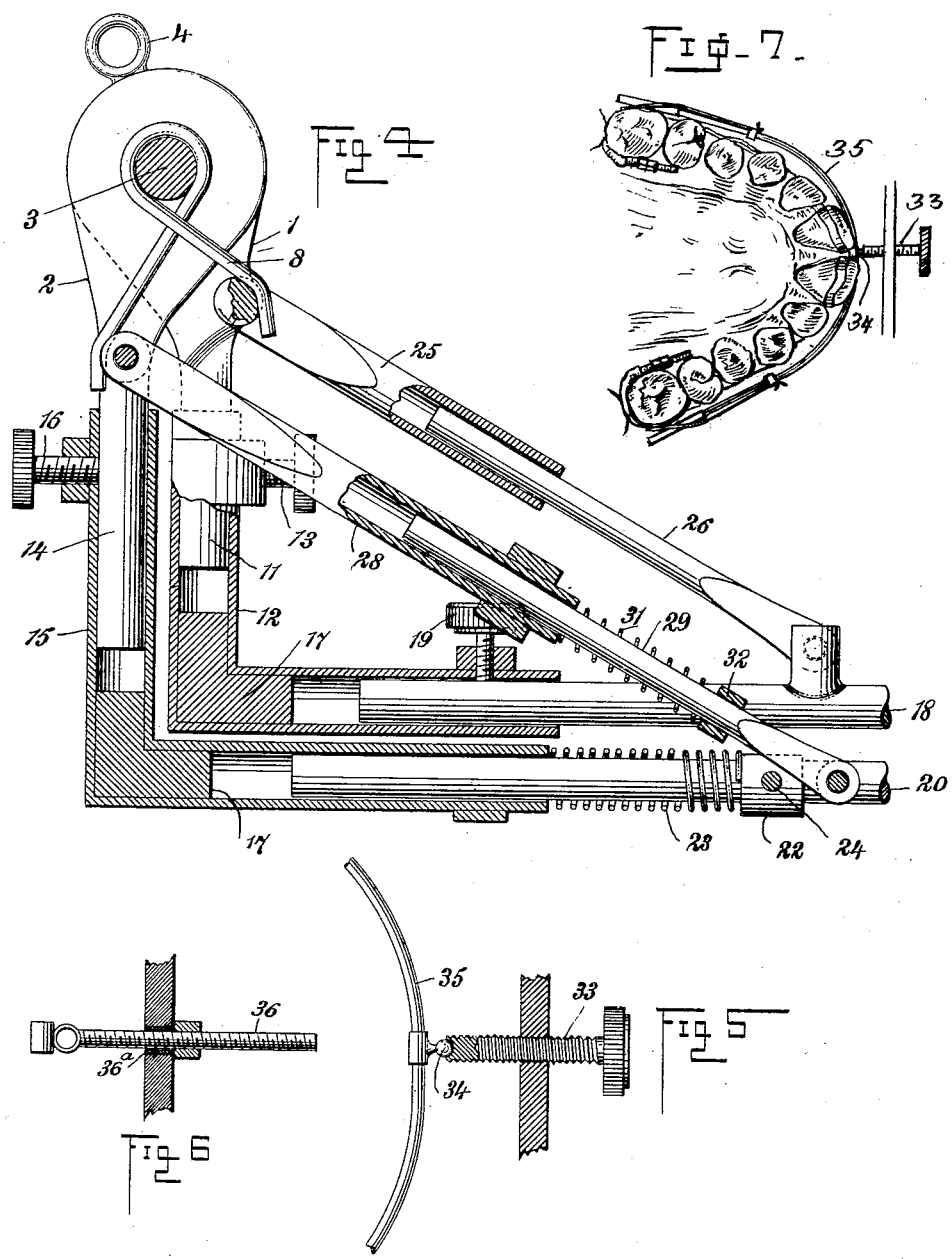
WITNESSES:
INVENTOR
Henry E. Lindas
BY
ATTORNEYS

UNITED STATES PATENT OFFICE.

HENRY EUGENE LINDAS, OF GREATBEND, KANSAS.

DENTAL APPLIANCE.

SPECIFICATION forming part of Letters Patent No. 702,805, dated June 17, 1902.

Application filed October 21, 1901. Serial No. 79,376. (No model.)

*To all whom it may concern:*

Be it known that I, HENRY EUGENE LINDAS, a citizen of the United States, and a resident of Greatbend, in the county of Barton and State of Kansas, have invented a new and Improved Dental Appliance, of which the following is a full, clear, and exact description.

This invention relates to improvements in devices for use in the correction of certain irregularities of the teeth and to establish harmonious relations between the jaws; and the objects are to enable the operator to make use of all the teeth in each dental arch as a reciprocal anchorage for changing the relative shape of maxilla and at the same time permit the opening and closing of the mouth and all necessary movement of the lower jaw without interfering with the amount or direction of force to be used in the correction of the facial or oral deformity—*i. e.*, where one maxilla is anterior to normal and occluding or opposite maxilla is posterior to normal the appliance will enable the operator to exercise reciprocal force to bring both maxilla to normal position, to make use of all the teeth in one arch as an anchorage to force the occluding maxilla to normal, to make use of the teeth in one dental arch as an anchorage to correct a mesial or distal occlusion occurring on one side of occluding arch, to make use of the teeth in both dental arches as a reciprocal anchorage in correcting irregularities of individual teeth in each arch, and to make use of teeth in one arch to correct irregularities of teeth in occluding dental arch.

I will describe a dental appliance embodying my invention and then point out the novel features in the appended claims.

Reference is to be had to the accompanying drawings, forming a part of this specification, in which similar characters of reference indicate corresponding parts in all the figures.

Figure 1 shows a dental appliance embodying my invention as in use. Fig. 2 is a side view of the device. Fig. 3 is a plan view, partly in section. Fig. 4 is a sectional elevation. Fig. 5 is a sectional view showing one of the forcing-screws employed. Fig. 6 is a similar view showing a detail hereinafter more fully described, and Fig. 7 is a detail showing the means of attaching an anchoring-arch.

The device comprises hinge members 1 2 at opposite sides, pivoted together by means of a screw or pins 3, and on the inner members of the hinges are eyes 4, from which straps or cords 6 extend to a cap 7, designed to be placed on a person's head to hold the device in position. The hinge-sections are connected by means of springs 8, which have their central portions coiled about the screws 3, one member of the spring engaging with a lug 9 on the inner hinge-section, while the other member of the spring engages with a lug 10 on the outer hinge-section. These springs are designed to equalize the force or pressure of the device when the mouth is open. When the appliance is adjusted to the teeth and head-gear, the hinge-sections will of course remain in their proper positions without the aid of the spring. When the appliance is properly adjusted, the pin 3, holding the hinge members 1 and 2, is opposite and immediately external to the tempora maxillary articulation, and the relation of the lower arch, hereinafter described, to the lower jaw is perfect; but when the mouth is opened the condyles of the lower maxillary slide forward, leaving the hinge at the pin 3, posterior to the point of articulation of the jaw. This would tend to hold the mouth open. The springs 8 overcome this difficulty.

From the inner hinge-section a shank 11 extends downward and is adjustably connected with the vertical portion of an elbow or angle-bar 12. As here shown, the vertical portion of the angle-bar is tubular and the shank 11 is seated therein and held as adjusted by means of a thumb-screw 13. The member 2 of the hinge is also provided with a shank 14, which engages in the tubular vertical portion of an elbow or angle-bar 15 and is held as adjusted by means of a thumb-screw 16. The horizontal portions of these elbows or angle-bars are also tubular for a portion of their length. At the bend, however, I prefer to place in said elbows or angle-bars a filling 17, of metal, so as to strengthen the parts at the bend.

Connecting telescopically with the horizontal portions of the elbows 12 is an arch-bar 18, which may be held as adjusted by means of thumb-screws 19, and connecting telescopically with the horizontal portions of the elbows 15 is a lower arch-bar 20, which may be held as adjusted by means of set-screws 21. Arranged between the ends of the horizontal portions of the elbows 15 and collars 22, adjustable on the side members of the arch-bar 20, are springs 23, the tension of which may be regulated by adjusting the collars 22 and securing them as adjusted by set-screws 24.

From the inner members of the hinges brace-bars extend to connections with the side portions of the upper arch-bar 18. Each brace consists of an upper section 25, pivoted to the hinge-section 1, and a lower section 26, pivoted to a lug on the upper side of the arch-bar 18, as clearly shown in the drawings. The member 26 is adjustable in the member 25, and may be held as adjusted by a thumb-screw 27. Similar braces connect the hinge-sections 2 with the lower arch-bar. As here shown, these braces consist of upper tubular members 28, pivoted on the lugs 10, and lower members 29, pivoted to the sides of the side portions of the lower arch-bar 20. The members 29 may be held as adjusted in the members 28 by means of set or thumb screws 30; but when desired the said thumb-screws may be loosened, so as to permit a spring yielding play between the members by means of springs 31, arranged between the ends of the members or sections 28, and collars 32, arranged on the members 29.

It will be noted that the elbow-sections 12 are on a slightly-higher plane than the elbow-sections 15. Therefore they can swing readily free of one another, and it will be also noted that the several set or thumb screws are so located as to not interfere with the movements of the parts.

The central portions of the arch-bars are somewhat flattened, as indicated in Fig. 3, and in the lower bar are forcing-screws 33, which are designed to engage with projections in the form of balls, as indicated at 34, these balls or projections being secured to an anchoring-arch 35. This arch-bar 35 is to be placed in the mouth of the patient, and it has yielding hook ends for engaging with teeth in a well-understood manner. The inner ends of the screws, as shown in Fig. 5, are concaved. The arch-bars are shown as provided with a traction-screw 36 and two forcing-screws 33; but it will be understood that in practice both of the arch-bars will be provided with such number of traction-screws and forcing-screws as may be required by the irregularity which the device is employed to correct.

The springs 23 and 31, together with the collars 22 and 32 and screws 30 and 38, are to be used on the arch-bar 18 and its brace 26 in the correction of some irregularities and upon the arch-bar 20 and its brace 29 in the correction of other irregularities. The springs 23 and 31 are to restrict and control the backward and forward movement of the lower jaw and act as a cushion to the force. When it is desired to move the lower jaw forward, the spring 23 presses the arch-bar 20 forward, and the spring is arranged as shown in Fig. 2. In this case the traction-screw 36 should be inserted in the arch-bar 20 and the forcing-screw in the arch-bar 18. When the lower jaw is to be pushed backward, the positions of the screws are reversed—that is, the traction-screw is inserted in the arch 18 and the forcing-screw in the arch 20; but the springs in order to exert backward pressure should be placed on the arch-bar 18 and its brace 26.

In order to protect the threaded openings for the forcing-screws when the traction-screws are inserted in said openings, I provide a bushing 36$^a$, as shown in Fig. 6.

In forcing the upper jaw forward the springs and the traction-screw and forcing-screw are arranged the same as when the lower jaw is to be forced backward, while in forcing the upper jaw backward the springs and screws are arranged the same as when forcing the lower jaw forward. The force being entirely reciprocal, it is obvious that this arrangement is necessary.

When the springs, collars, and set-screws are on the arch-bar 20 and brace 29, the set-screws 27 and 30 are to be loosened and all others tightened, while when the springs, collars, and set-screws are on the arch-bar 18 and its brace 26 the set-screws 27 and 19 are to be loosened and all others tightened.

Having thus described my invention, I claim as new and desire to secure by Letters Patent—

1. A dental appliance, comprising arch-bars one arranged above the other, spring-yielding hinge members with which said arch-bars are adjustably connected, and braces extending between the sections of the hinges and the arch-bars, substantially as specified.

2. A dental appliance, comprising arch-bars one arranged above the other, elbow members in which the side portions of the arch-bars are arranged to slide, spring-yielding hinges having adjustable connection with the upwardly-disposed sections of the elbows, spring-yielding brace-connections between the outer members of the hinges and the lower arch-bar, and adjustable brace connections between the inner members of the hinges and the upper arch-bar, substantially as specified.

3. In a dental appliance, upper and lower arch-bars, elbow members in the horizontal portions of which the side portions of the upper arch-bar are mounted to slide, elbow members in the horizontal portions of which the sides of the lower arch-bar are mounted to slide, adjustable collars on the side portions of the lower arch-bar, springs arranged between said collars and the ends of the elbows, spring-yielding hinges, stems extending from the outer sections of the hinges into the upwardly-disposed sections of the elbows connecting with the lower arch-bar, means for holding said stems as adjusted, stems extending from the inner members of the hinges and adjustable in the upwardly-disposed members of the elbows connecting with the upper arch-bar, means for holding said stems as adjusted, braces pivotally connected at one end to the inner members of the hinges and at the other end to studs on the upper sides of the upper arch-bar, and braces pivotally connected at the upper ends to the outer members of the hinges and at the lower ends to the lower arch-bar, substantially as specified.

4. A dental appliance, comprising upper and lower arch-bars having spring-yielding and sliding connection, substantially as specified.

5. A dental appliance, comprising upper and lower arch-bars pivoted together, the pivotal connection being above the plane of the bars.

In testimony whereof I have signed my name to this specification in the presence of two subscribing witnesses.

HENRY EUGENE LINDAS.

Witnesses:
LOUIS ZUTAVERN,
FRANK W. BRINKMAN.